Oct. 19, 1943.      S. M. UDALE      2,332,280
VARIABLE VALVE TIMING DEVICE
Filed Dec. 15, 1941     2 Sheets-Sheet 1
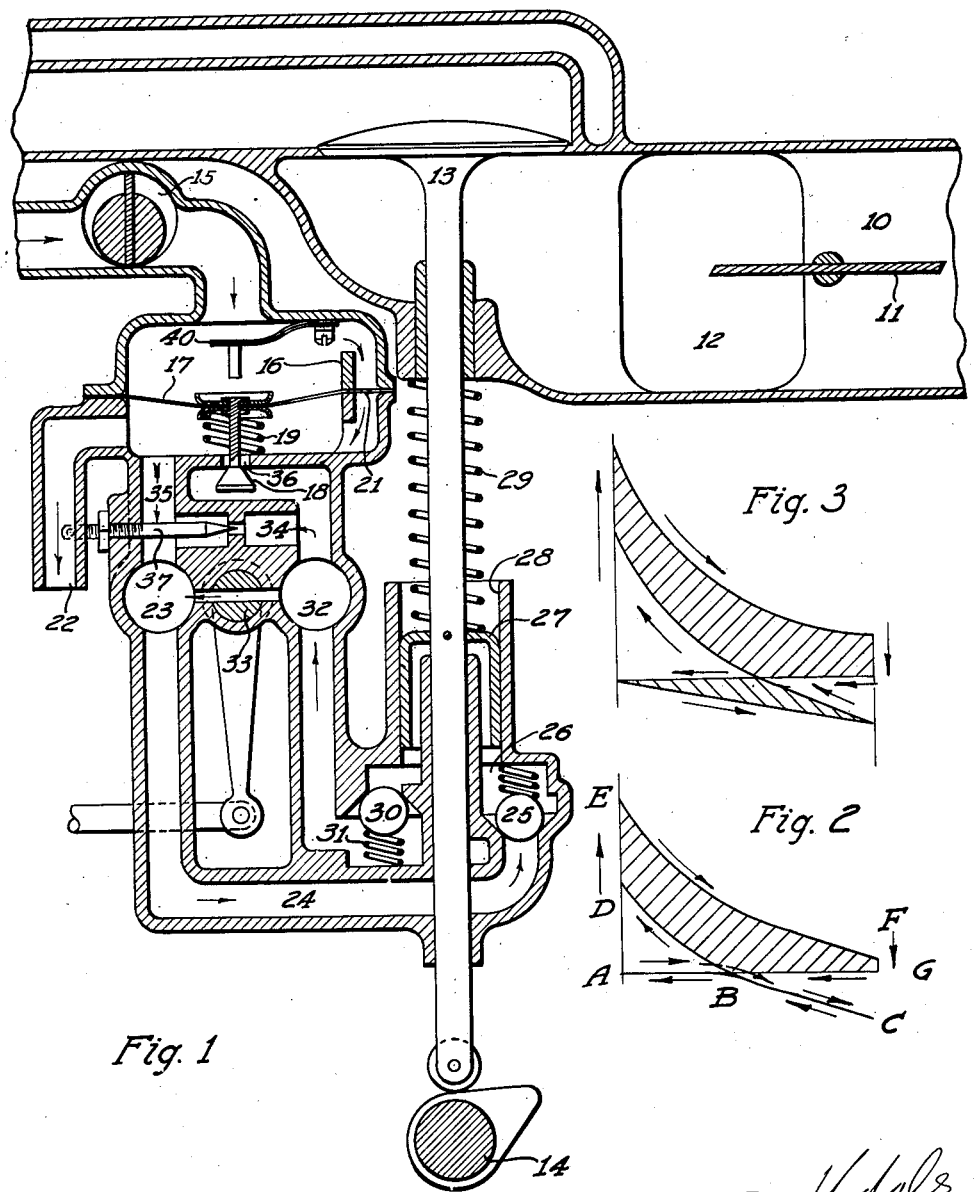

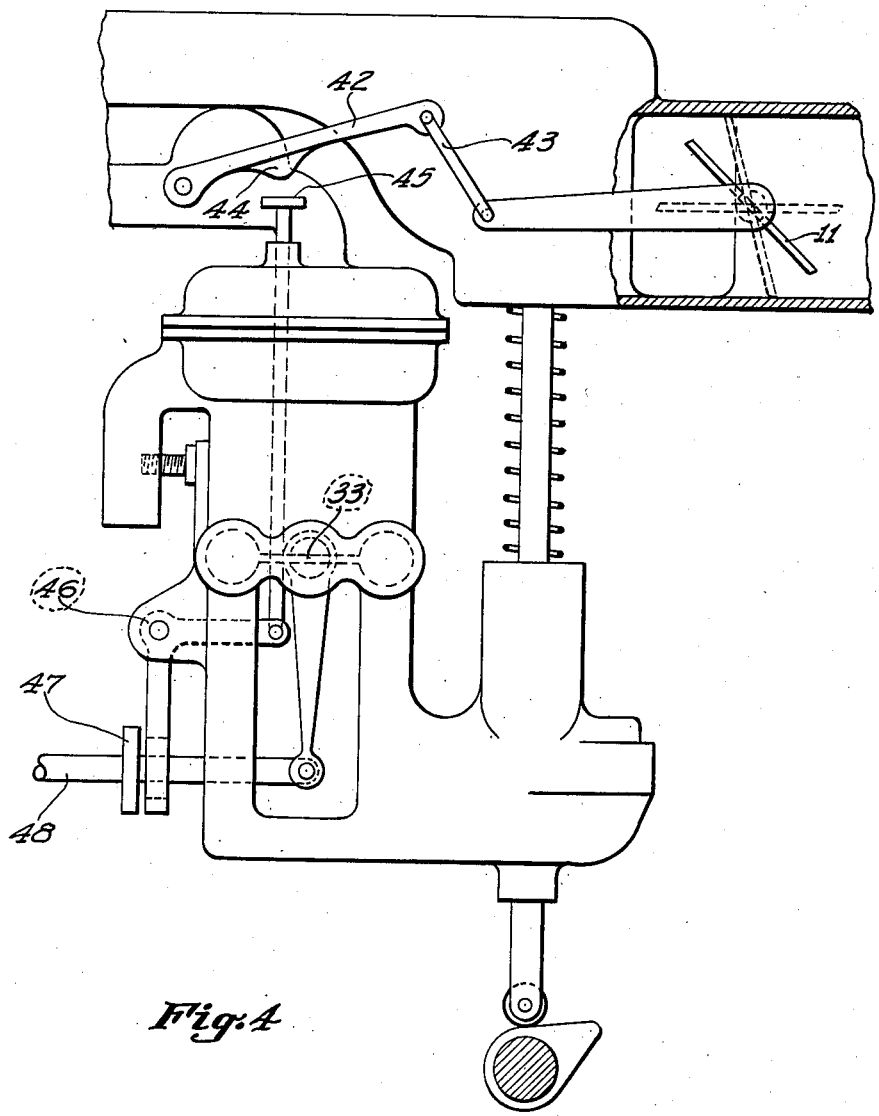

Patented Oct. 19, 1943

2,332,280

UNITED STATES PATENT OFFICE 2,332,280

VARIABLE VALVE TIMING DEVICE

Stanley M. Udale, Detroit, Mich., assignor to George M. Holley and Earl Holley

Application December 15, 1941, Serial No. 422,994

11 Claims. (Cl. 123—90)

The object of this invention is to develop the maximum power of an engine at every speed and to increase car mileage at all speeds by having one timing of the inlet valve for road load and another timing for full load. Obviously the timing that will give maximum mileage cannot give maximum power. Hence it should vary with load. For similar reasons it should vary with speed. All existing engines are provided with a valve timing which is a compromise.

In the drawings:

Fig. 1 shows diagrammatically the preferred form of my invention.

Fig. 2 shows the cycle that results from the valve timing for road load.

Fig. 3 shows the normal engine cycle which obtains when a car is driven under normal traffic conditions illustrating the negative loop which is eliminated by the cycle shown in Fig. 2.

Fig. 4 shows means whereby power in excess of the safe maximum can be temporarily obtained.

In the figures, 10 is the air or fuel mixture entrance; 11 is the throttle for controlling the air, etc.; 12 is an inlet manifold; 13 is one of the inlet valves timed by a cam 14 to throttle the charge so that the valve 13 opens at point A in the suction line AB of Fig. 2 and closes at point B. During the suction stroke BC, mixture expands B to C and is re-compressed to atmospheric pressure along the line CB, which should be identical with the line BC. The mixture is then compressed to pressure D, which pressure is reached as the piston travels back to top dead center. The mixture is then exploded and the pressure rises to equal the pressure E. The pressure then falls as the gas expands and the pressure falls until it equals pressure F, which is almost down to atmospheric pressure. The exhaust valve then opens and the pressure drops to G, which is the atmospheric line and then the exhaust is pushed out on the atmospheric line GA. ABCBDEFGA is an unconventional but economical cycle compared with the cycle shown in Fig. 3, which is the normal cycle now in universal use on all automobiles.

Delay in the closure of the valve 13 would produce the conventional truncated Otto cycle (Fig. 3). Hence the problem is to select the best cycle ABCBDEFGA to give the best normal mileage, then to transfer for full power to the conventional Otto cycle when power is the object. At full load the negative loop of Fig. 3 disappears. The power indicated by both Figs. 2 and 3 is approximately one-half power.

This system reduces the loss at road loads represented by the negative loop shown in Fig. 3, which loss is approximately the ratio of the negative loop area to the area of the diagram ABCBDEGBA of Fig. 2. Hence under these specific conditions a very definite gain in mileage results, the measure of the gain being roughly relative to the area of the negative loop in Fig. 3. In order to get an increase in pressure after the throttle 11 has been opened wide, it is only necessary to delay the closing of the valve 13 by the mechanism shown.

The delay in closure of the inlet valve 13 is obtained as follows:

An engine driven oil pump 15 delivers oil to a diaphragm chamber 16. The diaphragm 17 forms the lower wall of chamber 16 and carries the contoured valve 18 and is supported by the calibrated spring 19. A by-pass having a restriction 21 allows oil to flow through an overflow 22 where it is collected, recirculated, filtered, etc., in the ordinary way. The effect of the restriction 21 is to develop pressure on the diaphragm $17 = (R.P.M.)^2$.

The oil which flows through a passage 35 descends to a horizontal manifold 23 and from this manifold to a passage 24 past a non-return valve 25 to a cylinder 28. When the valve 13 rises, oil flows into the chamber 26 because the piston 27 is attached to valve 13 and is also close sliding fit in the cylinder 28. When the valve spring 29 returns the valve 13 to its seat, it must also expel the oil drawn into the chamber 26. This expulsion of the oil encounters no opposition, as a non-return valve 30 is only supported by a light spring 31 and this oil flows back into the oil manifold 32 and escapes through three paths, first through the variable passage in the manually controlled valve 33, second through the narrow path 34 which is restricted by the adjustable needle 37, and third through the variable opening 36 controlled by the contoured valve 18 carried by the diaphragm 17.

If the opening through the valve 33 is as big as shown, the second and third outlets have comparatively little influence. However, when the power represented by the cycle ABCBDEFGA is not good enough and it is necessary to get the necessary extra power demanded by the public, the valve 33 is therefore closed and the conventional Otto cycle (Fig. 3) established, only as the throttle 11 is wide open, the negative loop of Fig. 3 disappears.

Now at low speed wide open—below 500 R. P. M.–700 R. P. M.—the needle valve 35 is adjusted so that the engine just does not knock. This is all the power that is safe for the engine to deliver. Then as the engine speeds up, if this opening past the valve 37, that is, the narrow path 34, were the only path, then the time of closing would be too great and the great delay in closure of the inlet valve 13 would permit the mixture to be returned to the inlet manifold 12. To prevent this, the valve 18 opens in response to an increase in speed. The faster the engine goes, the faster the engine drives the pump 15. The faster the pump 15 revolves the more pressure there is on the diaphragm 17 and the more the passage 36 is opened by the descent of the contoured valve 18, so that at every speed there is a definite position of the valve 18 and this corresponds to a definite time for the inlet valve 13 to close to give the maximum power at the given speed. In this way the valve timing varies with the speed.

To anticipate the effect of the viscosity of the oil before starting a cold engine, a bi-metal strip 40 engages with and moves the part 18 downwardly so that when the oil is cold and until the oil warms up, the engine cannot deliver its maximum power. A pressure relief valve is usually made integral with the pump 15 to prevent excessive pressures which might rupture the diaphragm 17. As the pump 15 might be the oil pump which lubricates the engine, in that event the oil could quickly reach the normal working temperatures of the engine. However, when using the mechanism shown, it can be adjusted so that the valve timing is not sensitive to temperature. The reason for this is that as the viscosity falls with an increase in temperature, then the inlet valve tends to seat quickly as the oil flows more easily through the restricted passage 34 which is adjustable and at the same time, the pressure acting on the diaphragm 17 falls as the resistance to the flow through 21 falls. Hence the valve 18 rises and restricts the opening 36 and thus increases the flow through the passage 34 and thus offsets and cancels out the effect of the decrease in viscosity on the dash pot 25, 26, 27, 28. The springs 29 of the inlet valves must be uniform and the throttle connections must be such that after the throttle 11 is opened wide—that is, after the throttle 11 has controlled the car through the normal driving range (up to 70 miles per hour)—if excessive power is desired, then the last movement of the foot accelerator closes the valve 33 and delays the closure of the valve 13 so as to get the last ounce of power out of the engine.

In Fig. 4 the foot accelerator 42 is shown engaging with the throttle 11 through the link 43. The portion 44 of the foot accelerator 42 engages with the head of a pin 45 when the foot accelerator is fully depressed. The pin 45 then causes a bell crank lever 46 to rotate and so engage with a collar 47 on the rod 48 which is connected to the valve 33. Hence, when the foot accelerator 42 is entirely depressed the valve 43 is closed for the purpose described.

What I claim is:

1. In an internal combustion engine having an exhaust valve timed at a fixed position of the engine cycle variable inlet valve timing comprising a dash pot associated with an engine inlet valve having a piston connected to the engine inlet valve stem, a cylinder in which the piston reciprocates as the engine inlet valve opens and closes, a non-return inlet valve, a non-return outlet valve, a source of liquid for filling the cylinder, a return passage for the liquid, so that the liquid freely escapes from the dash pot when the engine inlet valve seats, a control valve in said return passage adapted in one position to restrict the escape of the liquid and thus delay the closure of the engine inlet valve and in which there are two control valves associated together in parallel, one of them being a manually operated valve having, when wide open, a relatively large aperture adapted to give a relatively unrestricted flow therethrough and in which the second control valve is adapted to offer a relatively great restriction to the flow of liquid.

2. In an internal combustion engine having an exhaust valve timed at a fixed position of the engine cycle variable inlet valve timing comprising a dash pot associated with an engine inlet valve having a piston connected to the engine inlet valve stem, a cylinder in which the piston reciprocates as the engine inlet valve opens and closes, a non-return inlet valve, a non-return outlet valve, a source of liquid for filling the cylinder, a return passage for the liquid, so that the liquid freely escapes from the dash pot when the engine inlet valve seats, a control valve in said return passage adapted in one position to restrict the escape of the liquid and thus delay the closure of the engine inlet valve, and in which there is an automatically operated control valve responsive to engine speed including an engine driven liquid pump, a diaphragm, a chamber in which the diaphragm forms a wall, a restricted outlet from the chamber, the control valve being connected to the diaphragm, spring means connected with the diaphragm to resist the opening of the valve until the engine speed increases above a predetermined minimum speed.

3. In an internal combustion engine having an exhaust valve timed at a fixed position of the engine cycle variable inlet valve timing comprising a dash pot associated with an engine inlet valve having a piston connected to the engine inlet valve stem, a cylinder in which the piston reciprocates as the engine inlet valve opens and closes, a non-return inlet valve, a non-return outlet valve, a source of liquid for filling the cylinder, a return passage for the liquid, so that the liquid freely escapes from the dash pot when the engine inlet valve seats, a control valve in said return passage adapted in one position to restrict the escape of the liquid and thus delay the closure of the engine inlet valve, and in which there is an automatically operated control valve responsive to engine speed including an engine driven liquid pump, a diaphragm, a chamber in which the diaphragm forms a wall, a restricted outlet from the chamber, the control valve being connected to the diaphragm, spring means connected with the diaphragm to resist the opening of the valve until the engine speed increases, an additional control valve in parallel with the automatic valve, and manual means for operating said additional control valve, said valve being adapted when open to be relatively unrestricted so as to render the automatic valve less effective to control the timing of said engine valve.

4. In an internal combustion engine having an exhaust valve timed at a fixed position of the engine cycle variable inlet valve timing comprising a dash pot associated with an engine inlet valve having a piston connected to the engine inlet valve stem, a cylinder in which the piston reciprocates as the engine inlet valve opens and closes, a non-return inlet valve, a non-return outlet valve, a source of liquid for filling the cylinder, a return passage for the liquid, so that the liquid freely escapes from the dash pot when the engine inlet valve seats, a control valve in said return passage adapted in one position to restrict the escape of the liquid and thus delay the closure of the engine inlet valve, and in which there is an automatically operated control valve responsive to engine speed including an engine driven liquid pump, a diaphragm, a chamber in which the diaphragm forms a wall, a restricted outlet from the chamber, the control valve being connected to the diaphragm, spring means connected with the diaphragm to resist the opening of the valve until the engine speed increases, two additional control valves associated together and with the automatic valve so that all three are in parallel with each other, one of the additional control valves having a relatively large aperture adapted when open to give relatively unrestricted liquid flow therethrough and in which the third control valve is adapted to offer a relatively great restriction to the flow of liquid therethrough.

5. In an internal combustion engine having an exhaust valve timed at a fixed position of the engine cycle variable inlet valve timing comprising a dash pot associated with an engine inlet valve having a piston connected to the engine inlet valve stem, a cylinder in which the piston reciprocates as the engine inlet valve opens and closes, a non-return inlet valve, a non-return outlet valve a source of liquid for filling the cylinder, a return passage for the liquid, so that the liquid freely escapes from the dash pot when the engine inlet valve seats, a control valve in said return passage adapted in one position to restrict the escape of the liquid and thus delay the closure of the engine inlet valve, and in which there is an automatically operated control valve responsive to engine speed including an engine driven liquid pump, a diaphragm, a chamber in which the diaphragm forms a wall, a restricted outlet from the chamber, the control valve being connected to the diaphragm, spring means connected with the diaphragm to resist the opening of the valve until the engine speed increases, liquid temperature responsive means adapted when cold to engage with said diaphragm and to assist in the opening of the valve.

6. In an internal combustion engine having constant exhaust valve timing and variable inlet valve timing comprising a liquid dash pot associated with said inlet valve, said dash pot being adapted to permit the rapid opening of the valve and to delay the closure thereof, and means for regulating the dash pot to control the rate of closure of the valve.

7. A device as set forth in claim 6 in which there is a manually operated valve to control the dash pot so as to regulate the rate of closure of the valve.

8. A device as set forth in claim 6 in which there are two control valves to control the dash pot so as to regulate the rate of closure of the valve, one valve being manually operated, the other valve being responsive to the number of revolutions per minute of the engine.

9. A device as set forth in claim 6 in which there are two control valves adapted to control the dash pot so as to regulate the rate of closure of the valve, one valve being manually operated, the other valve being responsive to the number of revolutions per minute of the engine, and thermostatic means for controlling the second control means.

10. A device as set forth in claim 6 in which there is an adjustable fixed opening to permit oil to escape from the dash pot and a variable opening responsive to the revolutions per minute of the engine.

11. A device as set forth in claim 1 in which there is a throttle valve in the air entrance to the inlet valve of the engine, mechanism connecting the manually controlled throttle valve with the control valve for the timing of the inlet valve, whereby when the throttle valve is opened wide, the control valve is closed so as to restrict the escape of the liquid and thus delay the closure of the engine inlet valve.

STANLEY M. UDALE.